(12) United States Patent
Spesser et al.

(10) Patent No.: US 11,355,945 B2
(45) Date of Patent: Jun. 7, 2022

(54) COMPENSATION DEVICE FOR DISCHARGE CURRENTS

(71) Applicants: Dr. Ing. h.c. F. Porsche Aktiengesellschaft, Stuttgart (DE); Fraunhofer-Gesellschaft zur Foerderung der angewandten Forschung e.V., Munich (DE)

(72) Inventors: Daniel Spesser, Illingen (DE); Tim Pfizenmaier, Leonberg (DE); Florian Mayer, Freiberg am Neckar (DE); Stefan Endres, Reichenschwand (DE); Christoph Sessler, Erlangen (DE)

(73) Assignees: Dr. Ing h.c. F. Porsche Aktiengesellschaft; Fraunhofer-Gesellschaft zur Foerderung der angewandten Forschung e.V.

( * ) Notice: Subject to any disclaimer, the term of this patent is extended or adjusted under 35 U.S.C. 154(b) by 0 days.

(21) Appl. No.: 17/158,233

(22) Filed: Jan. 26, 2021

(65) Prior Publication Data

US 2021/0257848 A1  Aug. 19, 2021

(30) Foreign Application Priority Data

Feb. 18, 2020 (DE) .................... 10 2020 104 133.0

(51) Int. Cl.
*H02J 7/00* (2006.01)
*B60R 16/033* (2006.01)

(52) U.S. Cl.
CPC ........ *H02J 7/00712* (2020.01); *B60R 16/033* (2013.01); *H02J 7/0068* (2013.01); *H02J 7/00308* (2020.01)

(58) Field of Classification Search
None
See application file for complete search history.

(56) References Cited

U.S. PATENT DOCUMENTS

2014/0210411 A1* 7/2014 Fluxa .................. B60L 53/18
320/109
2020/0036180 A1  1/2020 Spesser et al.
(Continued)

FOREIGN PATENT DOCUMENTS

DE        195 25 417      1/1997
DE    10 2010 013 642    10/2011
(Continued)

OTHER PUBLICATIONS

German Examination Report dated Jun. 29, 2020.

*Primary Examiner* — Jared Fureman
*Assistant Examiner* — Aqeel H Bukhari
(74) *Attorney, Agent, or Firm* — Gerald E. Hespos; Michael J. Porco; Matthew T. Hespos (57) ABSTRACT

A compensation device (20) for compensating for a discharge current has a compensation current generation device (28), a potential generation device (150), active conductor terminals (61, 62, 63, 64) and a PE conductor terminal (65), which active conductor terminals (61, 62, 63, 64) have a first active conductor terminal (61) and a second active conductor terminal (62; 64), which potential generation device (150) is interconnected with the first active conductor terminal (61) and has a potential generation device terminal (155), which potential generation device (150) is designed to provide a potential at the potential generation device terminal (155) which at least temporarily differs from the potential at the first active conductor terminal (61), and which compensation current generation device (28) is designed to effect a compensation current (I_COMP) between the poten- (Continued)

tial generation device terminal (155) and the PE conductor terminal (65).

15 Claims, 7 Drawing Sheets

(56) References Cited

U.S. PATENT DOCUMENTS

| | | | |
|---|---|---|---|
| 2020/0070677 A1 | 3/2020 | Spesser et al. | |
| 2021/0006235 A1 | 1/2021 | Karinca | |
| 2021/0038903 A1* | 2/2021 | Forsell | ............... A61N 1/37211 |

FOREIGN PATENT DOCUMENTS

| | | |
|---|---|---|
| DE | 10 2018 103 391 | 8/2019 |
| DE | 10 2018 118 259 | 1/2020 |
| DE | 10 2018 121 320 | 3/2020 |
| EP | 2 724 443 | 3/2016 |
| GB | 2 370 433 | 6/2002 |
| WO | 2008/020029 | 2/2008 |

* cited by examiner

COMPENSATION DEVICE FOR DISCHARGE CURRENTS

CROSS REFERENCE TO RELATED APPLICATION

This application claims priority under 35 USC 119 to German Patent Appl. No. 10 2020 104 133.0 filed on Feb. 18, 2020, the entire disclosure of which is incorporated herein by reference.

BACKGROUND

Field of the Invention

The invention relates to a compensation device for compensating for discharge currents, in particular for use in the charging device of a vehicle.

Discharge currents are electrical currents that flow under conventional operating conditions in an undesired current path, for example from one of the outer conductors (L1 to L3) to the PE conductor (PE). Such discharge currents in practice occur, for example, as a result of filter capacitors of a line filter that are connected on one side to an AC voltage path and on the other side to the PE conductor (PE).

Related Art

DE 195 25 417 C2 discloses an arrangement for ground-fault current compensation on a polyphase electrical line network having a passive reactance element.

DE 10 2010 013 642 A1 discloses a method for compensating for discharge currents.

EP 2 724 443 B1 discloses a compensation system for a leakage current.

The object of the invention consists in providing a novel compensation device for compensating for discharge currents and a vehicle having such a compensation device.

SUMMARY

A compensation device to compensate for a discharge current has a compensation current generation device, a potential generation device, active conductor terminals and a PE conductor terminal. The active conductor terminals have a first active conductor terminal and a second active conductor terminal. The potential generation device is interconnected with the first active conductor terminal and has a potential generation device terminal. The potential generation device is designed to provide a potential at the potential generation device terminal that differs, at least temporarily, from the potential at the first active conductor terminal. The compensation current generation device is designed to effect a compensation current between the potential generation device terminal and the PE conductor terminal. The potential generation device makes it easier for the compensation current generation device to effect the compensation current.

In one embodiment, the potential generation device is interconnected with the second active conductor terminal, and the potential generation device is designed to provide a potential at the potential generation device terminal that differs, at least temporarily, from the potential at the second active conductor terminal. The interconnection of the potential generation device with a plurality of active conductor terminals, enables the potential at the potential generation device terminal to be influenced advantageously.

In accordance with one embodiment, the potential generation device has a first capacitor arrangement, and the potential generation device terminal is interconnected with the first active conductor terminal via the first capacitor arrangement. The capacitor arrangement enables positive influencing of the compensation current.

In accordance with one embodiment, the potential generation device has a second capacitor arrangement, and the potential generation device terminal is interconnected with the second active conductor terminal via the second capacitor arrangement. The two capacitor arrangements can thereby interact with one another.

The compensation device may a line filter with X-capacitor arrangements for suppressing differential-mode interference and Y-capacitor arrangements for suppressing common-mode interference. The X-capacitor arrangements may comprise a first X-capacitor arrangement between the first active conductor terminal and the second active conductor terminal. The first capacitor arrangement and the second capacitor arrangement together form the first X-capacitor arrangement.

The X-capacitor arrangements may comprise a second X-capacitor arrangement between the first active conductor terminal and a further active conductor terminal. The further active conductor terminal is not the second active conductor terminal. The first X-capacitor arrangement has a first capacitance, and the second X-capacitor arrangement has a second capacitance. The second capacitance in some embodiments is in the range of between 70% and 130% of the first capacitance. This results in a largely symmetrical design of the X-capacitor arrangements.

The Y-capacitor arrangements may comprise a first Y-capacitor arrangement and a second Y-capacitor arrangement. The first Y-capacitor arrangement may be connected between the first active conductor terminal and the PE conductor terminal, and the second Y-capacitor arrangement may be connected between the second active conductor terminal and the PE conductor terminal. The Y-capacitor arrangements improves the line filter.

In some embodiments, the active conductor terminals have a third active conductor terminal, the potential generation device has a third capacitor arrangement, and the potential generation device terminal is interconnected with the third active conductor terminal via the third capacitor arrangement. This enables the formation of a virtual neutral conductor or the joint utilization of the capacitor arrangements for higher currents.

In some embodiments, the potential generation device has a fourth capacitor arrangement. The fourth capacitor arrangement may be connected between the compensation current generation device and the potential generation device terminal. The fourth capacitor arrangement enables the total capacitance of the potential generation device to be influenced without influencing the capacitance between the first active conductor terminal and the second active conductor terminal.

The compensation device may have a DC link. Y-capacitors are provided at the DC link, and have a first total capacitance. The potential generation device of the compensation device has a second total capacitance that is in the range of from 60% to 140% of the first total capacitance. As a result, the compensation device has a similar behavior to the Y-capacitors and enables an interconnection by means of which, when a power supply grid is connected with phases in opposition, the discharge currents are passively reduced.

A compensation device for compensating for a discharge current may have compensation current generation devices, active conductor terminals, a PE conductor terminal, a power supply unit and a control device. The active conductor terminals may have a first active conductor terminal and a second active conductor terminal. The compensation current generation devices may comprise a first compensation current generation device and a second compensation current generation device. The first compensation current generation device may be connected between the first active conductor terminal and the PE conductor terminal, and the second compensation current generation device may be connected between the second active conductor terminal and the PE conductor terminal. The compensation current generation devices each have a compensation current actuator. The control device is designed to drive, with the aid of the power supply unit, the compensation current actuators for generating a compensation current. The plural compensation current generation devices enable the phases in opposition to be utilized, and the power supply unit enables driving of the compensation current actuators even when the phases have a low voltage.

The compensation current generation devices each may have a voltage reducer. The voltage reducers may be provided between the compensation current actuator and the associated active conductor terminal and are designed to reduce the voltage at the associated compensation current actuator in comparison with the voltage at the associated active conductor terminal. The reduction in the voltage enables the compensation current actuators to be designed for lower voltages, thereby reducing costs and technical complexity.

In accordance with one embodiment, the voltage reducers each have a resistance or a voltage limiter. These two solutions work well for the compensation current generation devices.

In accordance with one embodiment, the compensation current generation devices each have a current-measuring element to measure the compensation current through the compensation current generation device. The measurement directly in the compensation current generation devices makes it possible to check more effectively and more quickly whether the compensation current is suitable for the compensation.

Each compensation current actuator may be designed to enable a compensation current in both directions. By virtue of the bidirectionality, a current is enabled both in the positive and in the negative half-cycles of the phases by switching-on the compensation current actuators.

In accordance with a further embodiment, a vehicle has a charging device for a traction battery. The charging device has a rectifier and a traction battery directly or indirectly to the rectifier. The traction battery is coupled galvanically to the active conductor terminals, and wherein the charging device has a compensation device. In the case of such charging devices, the compensation is particularly important, and the use of the compensation device is very advantageous.

Further details and advantageous developments of the invention result from the exemplary embodiments described below and illustrated in the drawings and should in no way be understood as a restriction of the invention.

DETAILED DESCRIPTION

In the text which follows, identical or functionally identical parts have the same reference symbols and generally are described only once. The description builds upon itself encompassing the figures to avoid unnecessary repetition.

Figure 1:
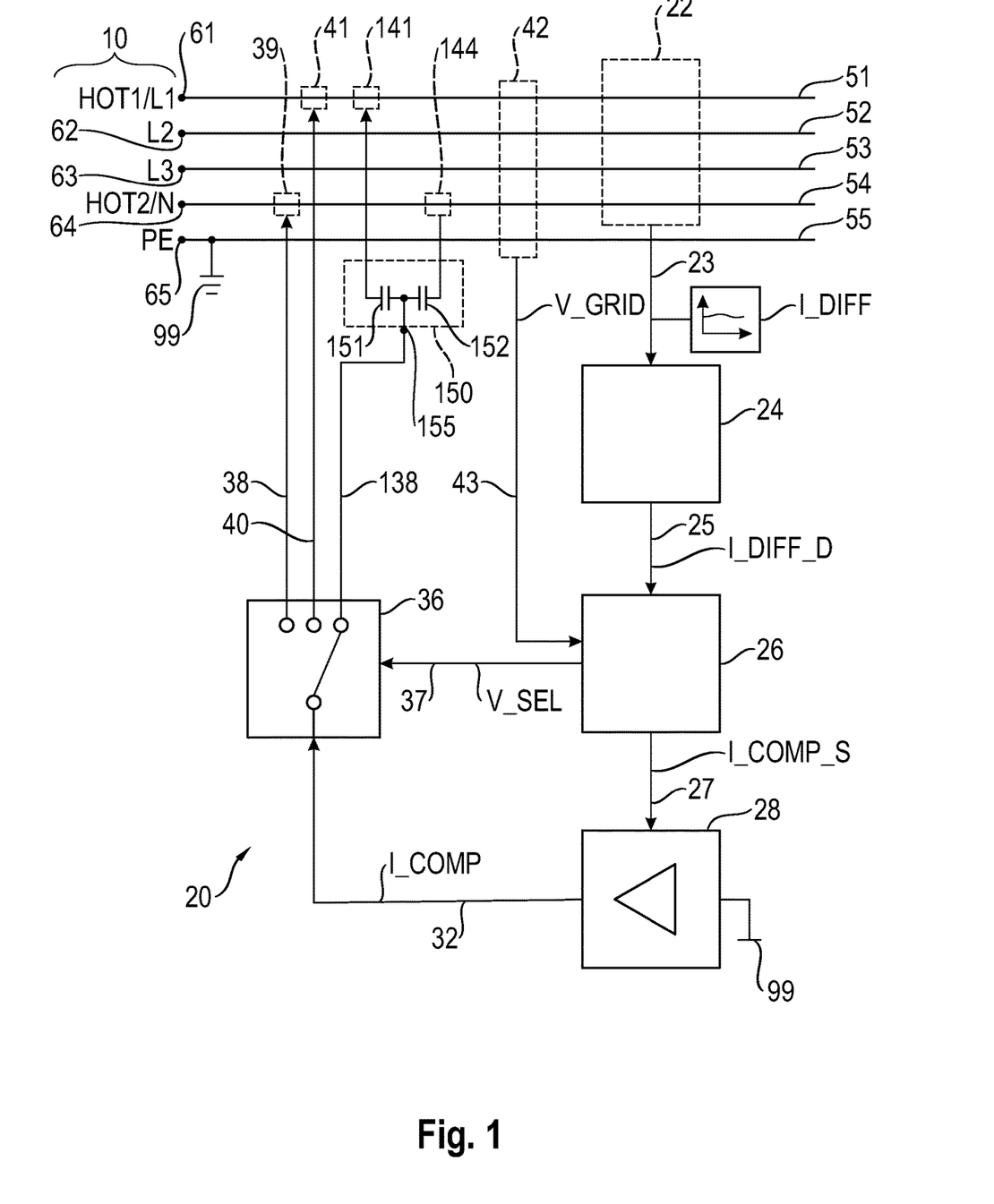
FIG. 1 shows an exemplary embodiment of a compensation device.

FIG. 1 shows an exemplary embodiment of a compensation device 20. Four active conductor terminals 61, 62, 63, 64 having four conductors 51, 52, 53, 54 and a PE conductor terminal 65 having a conductor 55 are provided. In the case of an AC grid, for example, the active conductor terminals 61 to 63 can be connected to the outer conductors (phases) L1, L2 and L3, the active conductor terminal 64 can be connected to the neutral conductor N, and the PE conductor terminal 65 can be connected to the PE conductor PE.

A differential current-measuring device 22 measures the differential current of the conductors 51 to 54. The differential current-measuring device 22 can be in the form of, for example, a summation current transformer in the form of a winding around the conductors 51 to 54. If no fault currents or discharge currents occur, the sum of the currents through the conductors 51 to 54 and therefore also the current through the winding is zero. If, on the other hand, for example via a Y-capacitor of a line filter, a discharge current flows from the phase L1 via a rectifier to the PE conductor PE, the differential current-measuring device 22 gives a resultant differential current. It is also possible to measure, for example, the summation current through the conductors 51 to 53, on the one hand, and through the conductor 54, on the other hand, separately and then to calculate, depending on the respective winding direction, the sum of or the difference between the two values.

The signal I_DIFF is supplied to a signal-conditioning device 24 via a line 23. In the signal-conditioning device 24, for example, an analog-to-digital conversion takes place, and the resultant digital signal is denoted by I_DIFF_D. The signal-conditioning device 24 transmits the signal I_DIFF_D to a control device 26 via a line 25. The control device 26, which is in the form of a microcontroller or an arithmetic logic unit, for example, calculates from the determined differential current signal I_DIFF_D a value or a compensation current preset signal I_COMP_S for a suitable compensation current. This signal I_COMP_S is supplied to a compensation current generation device 28 via a line 27, which compensation current generation device is in the form of an amplifier, for example.

The compensation current generation device 28 generates, depending on the compensation current preset signal I_COMP_S, a corresponding compensation current I_COMP. For this purpose, the compensation current generation device 28 is connected to the PE conductor 99 in order to enable a current from or to the PE conductor 99.

The compensation current generation device 28 can be in the form of a differential amplifier having an operational amplifier, for example. Alternatively, for example, an analog-to-digital converter or a class D amplifier is possible.

The compensation current generation device 28 is connected to a compensation current selection device 36 via a line 32 and supplies the signal I_COMP to said compensation current selection device.

The compensation current selection device 36 is drivable by the control device 26 via a line 37 with a signal V_SEL. The compensation current selection device 36 can supply the compensation current to a first infeed device 39 via a line 38, to a second infeed device 41 via a line 40, and/or to a potential generation device terminal 155 of a potential generation device 150 via a line 138.

A power supply grid identification device 42 is provided in order to identify the power supply grid connected to the conductors 51 to 55. For this purpose, the power supply grid identification device 42 measures, for example via a voltage-measuring device, the voltages at the terminals 61 to 65 and supplies a corresponding signal V_GRID to the control device 26 via a line 43. This can take place directly in the power supply grid identification device 42 or else in the control device 26. In the case of a Central European three-phase grid, the conductors 51 to 55 are connected to the terminals L1, L2, L3, N and PE illustrated on the left. In the case of a US split-phase grid, the terminal HOT1 is preferably connected to the conductor 51, the terminal HOT2, which is phase-shifted through 180°, is connected to the conductor 54, and the PE conductor PE is connected to the conductor 55. In the case of a single-phase Central European grid, owing to the plug/socket outlet assignment which is not definitive in all countries, either the conductor 51 is connected to L1 and the conductor 54 to N or the conductor 51 is connected to N and the conductor 54 is connected to L1. The assignment is therefore not necessarily definitive.

The infeed devices 39 and 41 can perform the infeed by means of a capacitive coupling or by means of an inductive coupling, for example.

In the case of a power supply grid with a neutral conductor N, the infeed preferably takes place to said neutral conductor since the voltage at the neutral conductor N is normally low, and the supply voltage for the infeed may therefore be low in comparison with the voltages at the phases.

The calculation of the signal I_COMP_S for the generation of the compensation current I_COMP takes place, for example, by determining the frequency spectrum of the differential current or of the signal I_DIFF, wherein, for example, a frequency range of from 20 Hz to 300 kHz may be sufficient. The frequency spectrum contains corresponding amplitudes, and the signal I_COMP_S is generated with a phase shift of 180° (in phase opposition) in order to effect a corresponding compensation. Other calculations in which the integral is calculated are also possible.

The potential generation device 150 is interconnected with the conductor 51 or terminal 61 via the infeed device 141 and with the conductor 54 or terminal 64 via the infeed device 144. The infeed devices 141 and 144 can each be in the form of direct connections to the corresponding conductor 51 or 54. The potential generation device 150 is designed to provide a potential at the potential generation device terminal 155 which at least temporarily differs from the potential at the active conductor terminal 61 and at the active conductor terminal 64. Since the potential at the active conductor terminals is sinusoidal or at least periodic, in the meantime it may arise that the potential at the active conductor terminal 61 corresponds to the potential at the potential generation device terminal 155.

The potential generation device 150 has a first capacitor arrangement 151 and a second capacitor arrangement 152, and the potential generation device terminal 155 is interconnected with the first active conductor terminal 61 via the first capacitor arrangement 151 and with the second active conductor terminal 64 via the second capacitor arrangement 152.

If a power supply grid 10 of the US split-phase type is connected to the phases HOT1 at the active conductor terminal 61 and HOT2 at the active conductor terminal 64, in the case of symmetrical amplitudes of the phases HOT1 and HOT2 and the same capacitor arrangements of the capacitor arrangements 151, 152, the phases HOT1 and HOT2 in phase opposition result in a voltage of 0 V being produced at the potential generation device terminal 155, and the infeed of the compensation current I_COMP is therefore readily possible into the potential generation device terminal 155. In the case of non-identical amplitudes of the phases HOT1 and HOT2 or in the case of different capacitances of the capacitor arrangements 151, 152, the voltage at the potential generation device terminal 155 is not constantly 0 V, but it is lower than the amplitudes of the phases HOT1 and HOT2.

Figure 2:
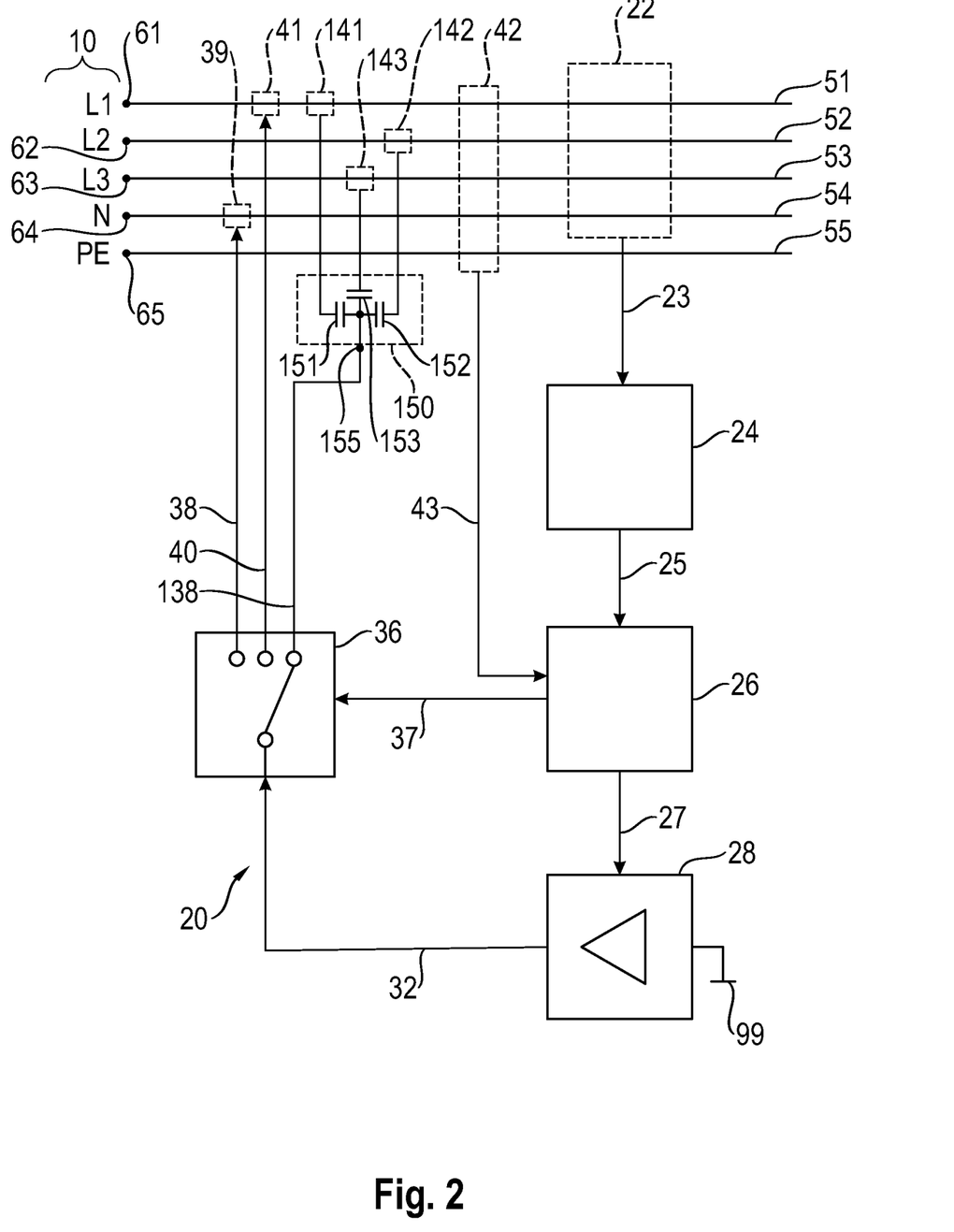
FIG. 2 shows a further exemplary embodiment of a compensation device.

FIG. 2 shows a further embodiment of the compensation device 20. The potential generation device 150 has the potential generation device terminal 155, which is connected to a capacitor arrangement 151, to a capacitor arrangement 152 and to a capacitor arrangement 153. The capacitor arrangement 151 is connected to the conductor 51 via the infeed device 141, the capacitor arrangement 152 is connected to the conductor 52 via an infeed device 142, and the capacitor arrangement 153 is connected to the conductor 53 via an infeed device 143. When a three-phase power supply grid having the phases L1, L2 and L3 is connected to the active conductor terminals 61, 62, 63, by virtue of the capacitor arrangements 151, 152, 153 at the potential generation device terminal 155 a virtual neutral conductor is formed, which has a voltage of 0 V given the same amplitudes of the phases L1, L2 and L3 and the same capacitances of the capacitor arrangements 151, 152, 153, and in the case of imperfect conditions at least a voltage which is lower than the amplitudes of the phases. A connection to a power supply grid 10 of the US split-phase type is also possible. In this case, the phase HOT1 can be supplied at the terminal 61 and the phase HOT2 can be supplied at the terminal 63, for example.

Moreover, the compensation device 20 can correspond to the compensation device 20 in FIG. 1, for example.

Figure 3:
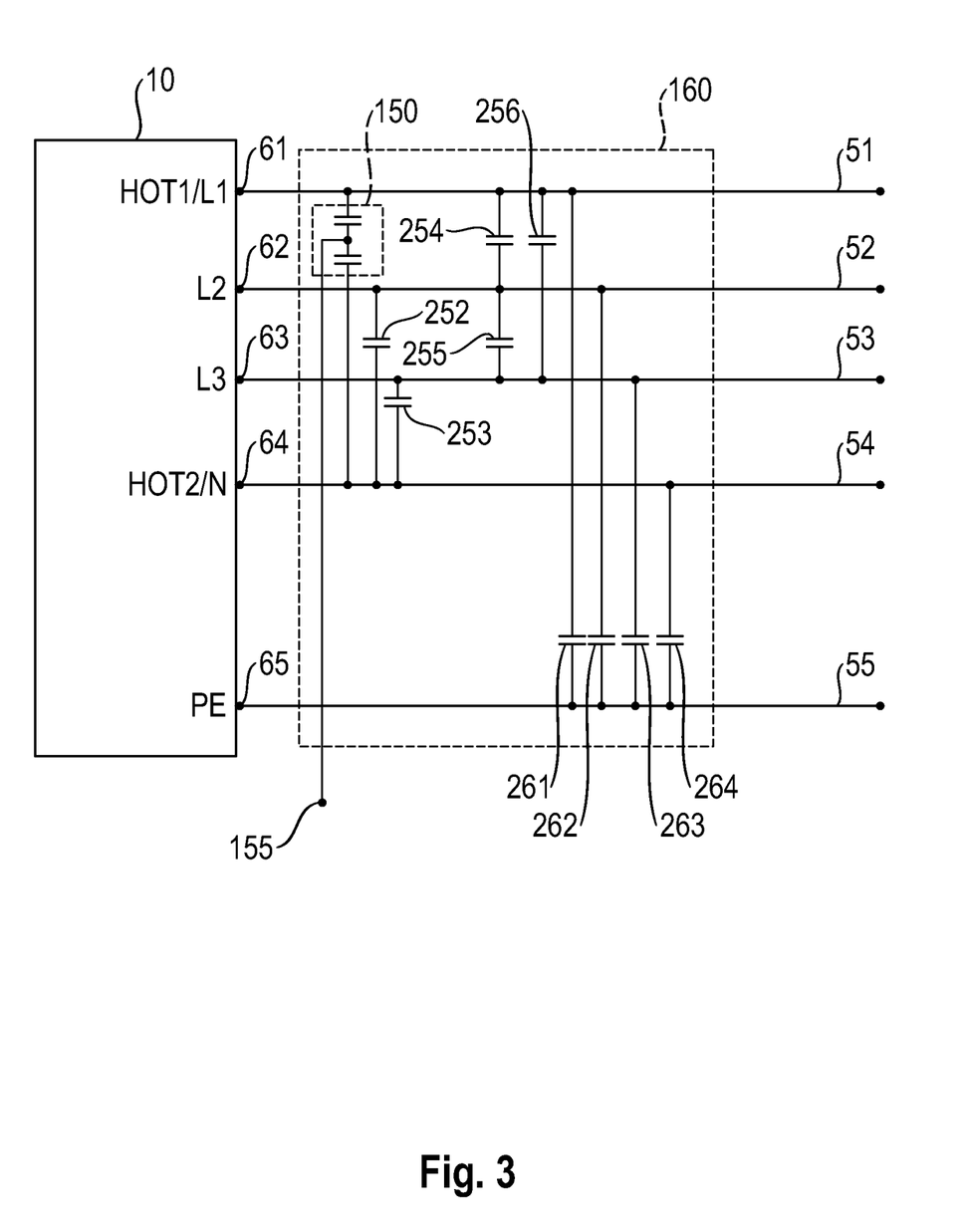
FIG. 3 shows a detail of part of the compensation device of FIG. 1.

FIG. 3 shows a detail of the embodiment from FIG. 1 with the power supply grid 10 and the conductors 51, 52, 53, 54, 55. By way of example, a line filter 160 is provided at the input region. The line filter 160 has X-capacitor arrangements 150, 252, 253, 254, 255, 256 for suppressing differential-mode interference and Y-capacitor arrangements 261, 262, 263, 264 for suppressing common-mode interference.

The X-capacitor arrangements 150, 252, 253, 254, 255, 256 are each provided between two of the active conductors 51, 52, 53, 54, and the Y-capacitor arrangements 261, 262, 263, 264 are each provided between one of the active conductors 51, 52, 53, 54 and the PE conductor 55.

The line filter 160 can additionally have inductances, and it may also have a multilevel design.

The X-capacitor arrangement 150 is split into two series-connected capacitors, wherein the center is connected to the potential generation device terminal 155. The X-capacitor arrangement 150 preferably has a capacitance which is in the region of the capacitance of at least one of the other X-capacitor arrangements. Preferably, the capacitance of at least one other X-capacitor arrangement 252, 253, 254, 255, 256 is in the range of between 70% and 130% of the X-capacitor arrangement 150. This results in a symmetrical line filter 160.

Figure 4:
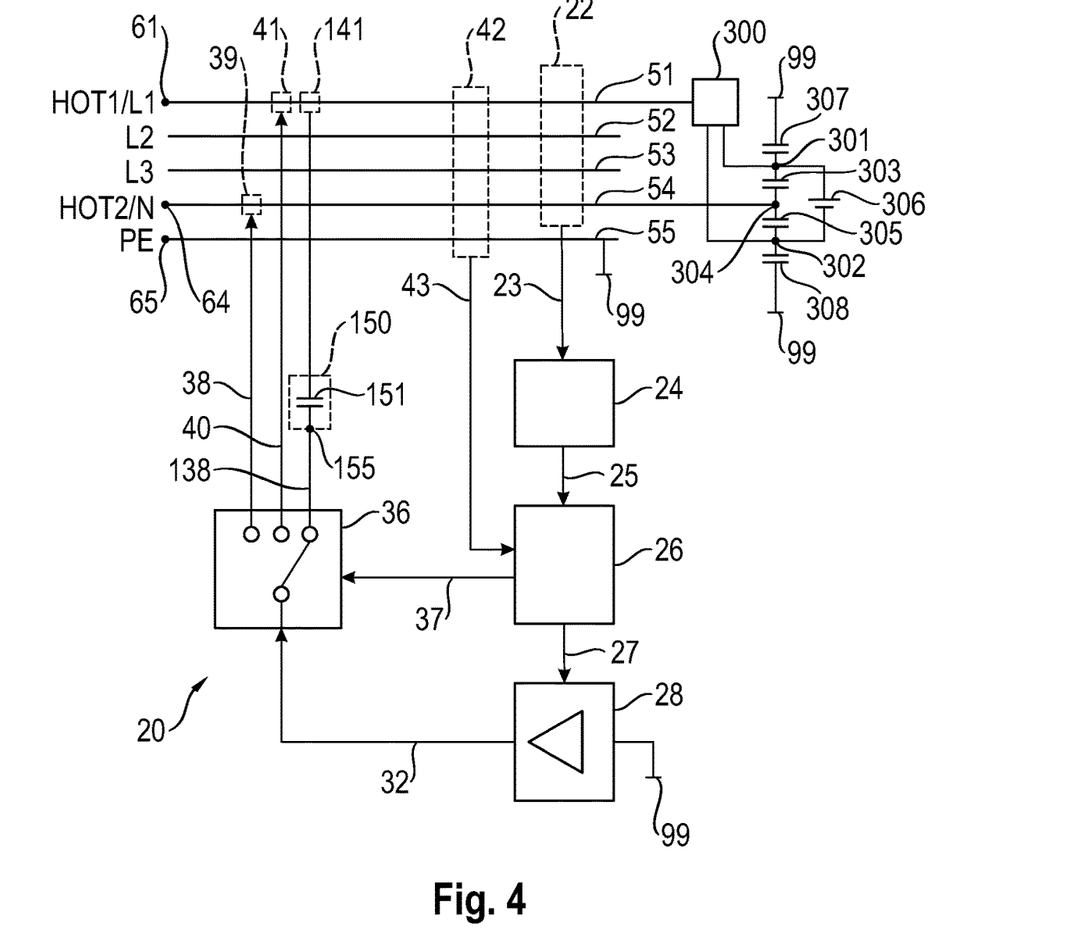
FIG. 4 shows a further exemplary embodiment of a compensation device.

FIG. 4 shows a further embodiment of the compensation device 20. The potential generation device 150 has the capacitor arrangement 151 between the potential generation device terminal 155 and the infeed device 141. No further infeed device is provided between the potential generation device terminal 155 and the conductors 51 to 54. Moreover, the design of the compensation device 20 can correspond to the design shown in FIG. 1.

Provided on the right-hand side is a DC link having a terminal 301 (for example high voltage positive) and a terminal 302 (for example high voltage negative). The terminal 301 is connected to a center point 304 via a DC-link capacitor 303, and the center point 304 is connected to the terminal 302 via a DC-link capacitor 305. The center point 304 is connected to the conductor 54. The terminal 301 is connected to the PE conductor 55 (PE conductor symbol 99) via a Y-capacitor 307, and the terminal 302 is connected to the PE conductor 55 via a Y-capacitor 308.

As a load, a battery 306 is connected to the terminals 301, 302, for example.

Power electronics 300 are electrically interconnected with the conductor 51 and with the terminals 301, 302.

During operation, in the case of a connection of a power supply grid of the US split-phase type, the power electronics 300 can be operated with the phases HOT1, HOT2 at the active conductor terminals 61, 64 and with the PE conductor PE at the terminal 65, and said power electronics act as a rectifier for rectification of the phases HOT1, HOT2 and power supply at the terminals 301, 302.

Figure 5:
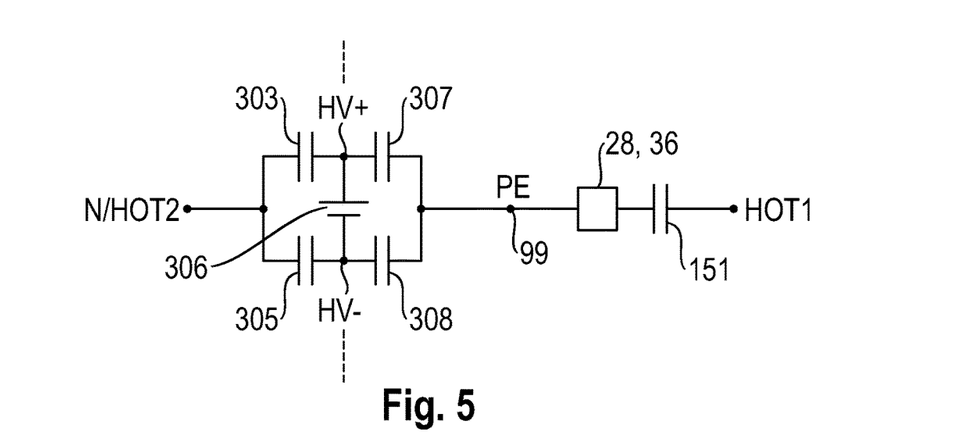
FIG. 5 shows a schematic illustration of the effect of the capacitors of FIG. 4.

FIG. 5 shows schematically the active capacitances between the phases HOT1 and PE or HOT2 and PE. A first path passes from the PE conductor PE via the Y-capacitors 307, 308 and via the DC-link capacitors 303, 305 to the phase HOT2 and to the neutral conductor N, respectively. A second path passes from the PE conductor PE via the circuit 28, 36 (cf. FIG. 4) and the capacitor 151 to the phase HOT1.

The discharge currents from the phase HOT2 to the PE conductor PE are predominately determined by the Y-capacitors 307, 308, and the DC-link capacitors 303, 305 are largely negligible. If the capacitance of the capacitor 151 is selected to be of the order of magnitude of the capacitance of the parallel circuit of the Y-capacitors 307, 308, and the potential generation device terminal 155 is connected to the PE conductor PE (PE conductor symbol 99) via the compensation current generation device 28, owing to the phase opposition of the phases HOT1 and HOT2, a discharge current of a comparable magnitude, but with the opposite mathematical sign, flows between the phases HOT1 and PE and between the phases HOT2 and PE, respectively. The sum of the discharge currents is therefore zero or at least low. In other words, the impedance between the phases HOT1 or HOT2, on the one hand, and the PE conductor PE, on the other hand, given the line frequency of, for example, 50 Hz or 60 Hz, is comparable, and this results in passive compensation of the discharge currents.

If, during actual operation, a resultant discharge current nevertheless arises owing to asymmetries, a compensation current can be impressed actively via the compensation current generation device 28. The compensation current generation device 28 can in this case either be in the form of a voltage source or in the form of a current source in order to generate the required compensation current.

In a test, the Y-capacitors 307, 308 each have had a capacitance of 680 nF, and the capacitance of the capacitor 151 was selected at 1.29 µF, i.e. it corresponds to approximately the capacitance of the parallel circuit of the Y-capacitors 307, 308. The passive compensation by the capacitor 151 results in the discharge current which needs to be compensated for actively being significantly lower and, as a result, the compensation current generation device 28 is relieved of load.

Figure 6:
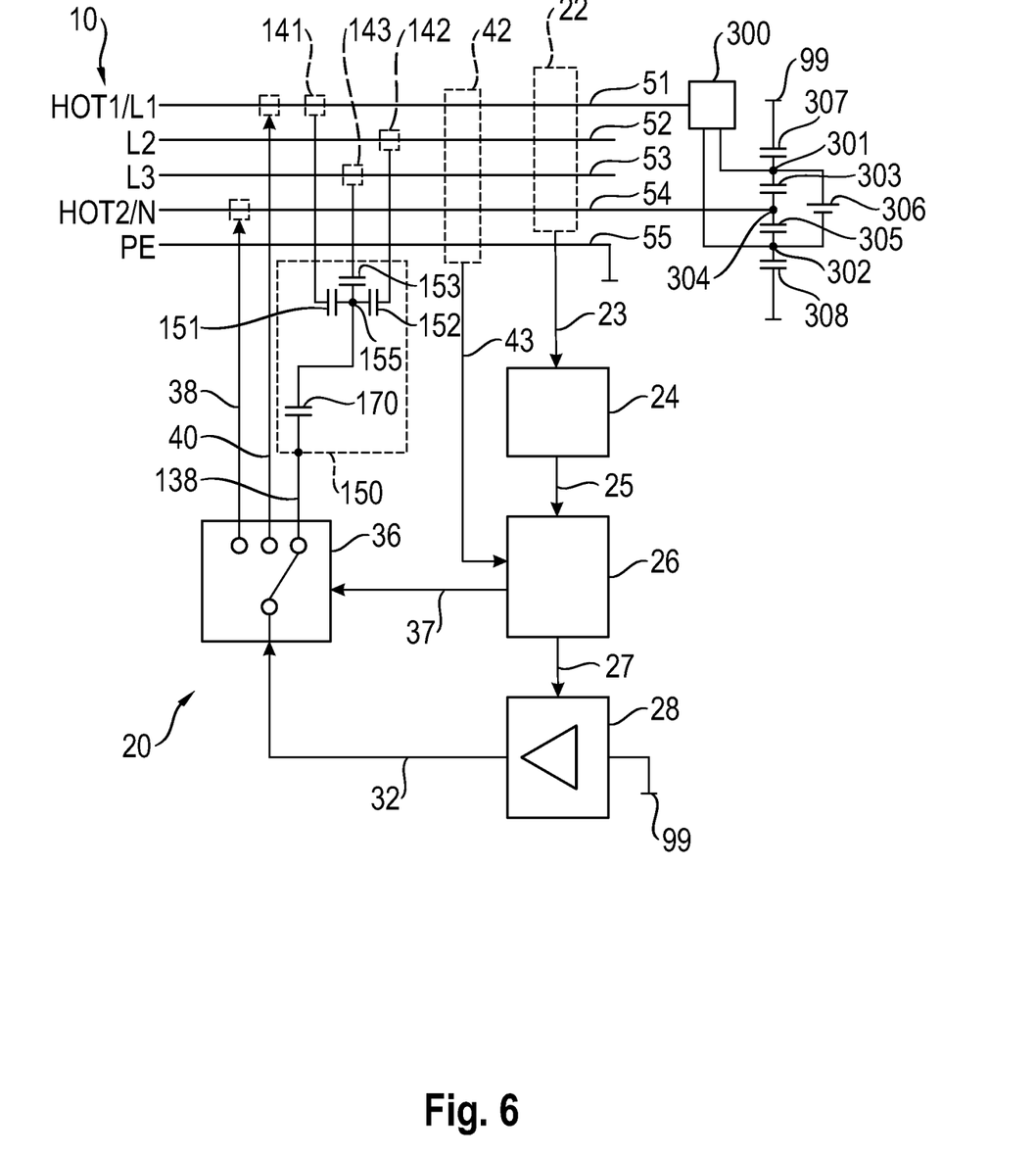
FIG. 6 shows a further exemplary embodiment of a compensation device.

FIG. 6 shows a further embodiment of the compensation device 20. The potential generation device 150, as in the exemplary embodiment in FIG. 2, has three capacitor arrangements 151, 152, 153, which are each connected between the potential generation device terminal 155 and the infeed devices 141, 142 and 143, respectively. In the case of a three-phase power supply grid 10, the capacitor arrangements 151, 152, 153 form a virtual neutral conductor at the potential generation device terminal 155. In the case of a connection (not illustrated) of a phase HOT1 or L1 to all three terminals 61, 62, 63 (cf. FIG. 3), the capacitors 151, 152, 153 act as a parallel circuit. In addition, a capacitor 170 is connected between the potential generation device terminal 155 and the compensation current generation device 28. By virtue of the capacitors 151, 152, 153, the capacitance of the resultant X-capacitor from the respective series circuit can be matched to the capacitance of the remaining X-capacitors. Furthermore, via the additional capacitor 170, the total capacitance of the potential generation device 150 can be matched to the total capacitance of the remaining Y-capacitors in order to at least partially effect passive compensation.

Figure 7:
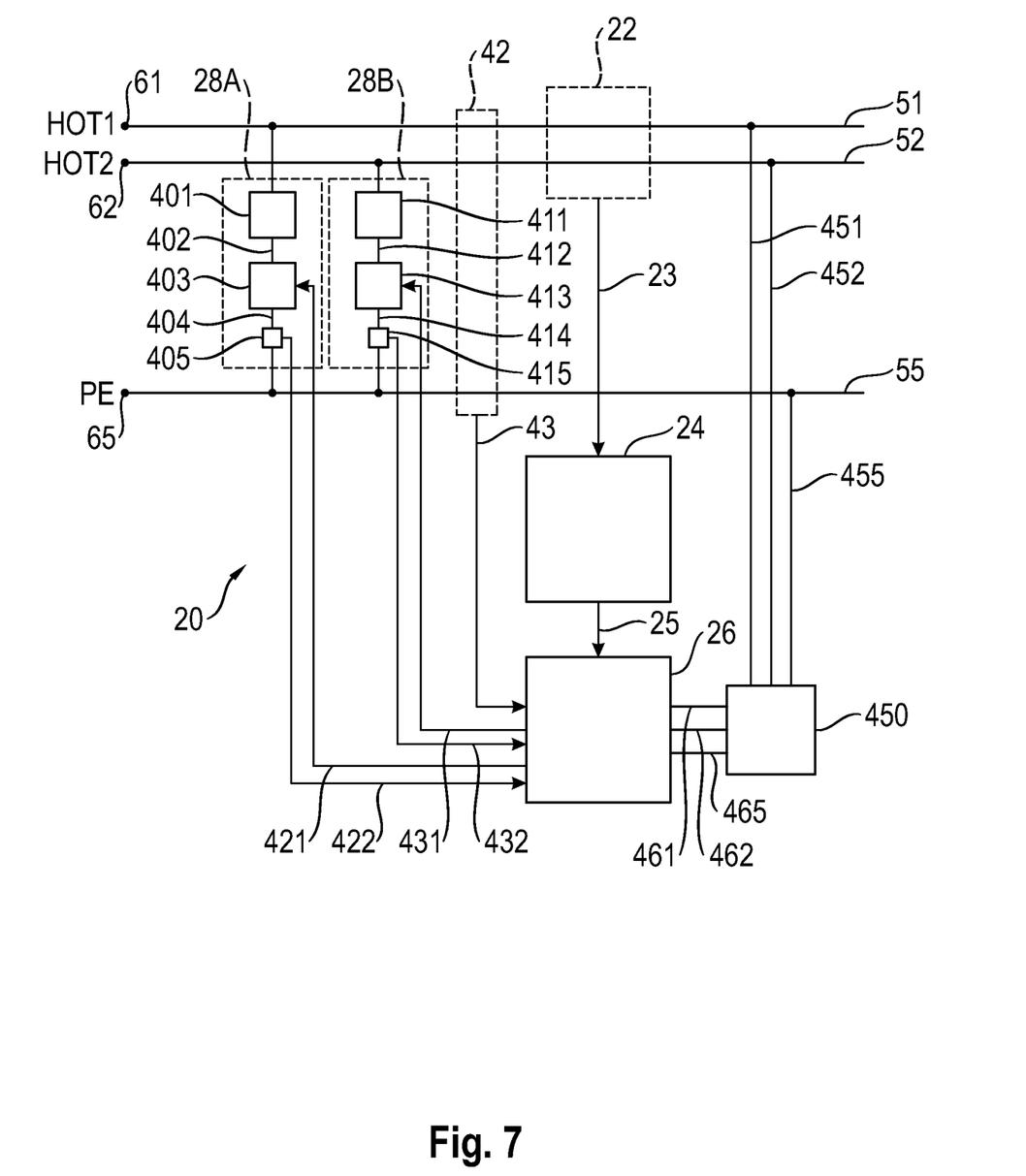
FIG. 7 shows a further exemplary embodiment of a compensation device.

FIG. 7 shows a further embodiment of a compensation device 20. The compensation device 20 has a first compensation current generation device 28A and a second compensation current generation device 28B.

The compensation current generation devices 28A, 28B are connected between one of the lines 51 or 52, on the one hand, and the PE conductor 55, on the other hand.

The compensation current generation device 28A has a voltage reducer 401, a compensation current actuator 403 and preferably a current-measuring element 405. The conductor 51 is connected to the PE conductor 55 via the voltage reducer 401, a line 402, the compensation current actuator 403, a line 404 and the current-measuring element 405.

The compensation current generation device 28B has a voltage reducer 411, a compensation current actuator 413 and preferably a current-measuring element 415. The conductor 52 is connected to the PE conductor 55 via the voltage reducer 411, a line 412, the compensation current actuator 413, a line 414 and the current-measuring element 415.

The control device 26 is connected to the compensation current actuator 403 via a line 421 and to the compensation current actuator 413 via a line 431.

The current-measuring element 405 is connected to the control device 26 via a line 422, and the current-measuring element 415 is connected to the control device 26 via a line 432.

Preferably, a power supply unit 450 is provided, which is connected to the conductor 51 via a line 451, to the conductor 52 via a line 452, and to the PE conductor 55 via a line 455 in order to supply a positive voltage on a line 461, a negative voltage on a line 462 and a zero voltage on a line 465 to the control device 26. The provision of the power supply unit 450 enables a buffer-stored current supply.

The voltage reducers 401 and 411 are designed to reduce the voltage at the associated compensation current actuator 403 or 413 in comparison with the voltage at the associated conductor 51 or 52. In a simple embodiment, the voltage reducers 401, 411 can be in the form of resistances. The voltage reducers 401, 411 can also be in the form of voltage limiters which limit the voltage at the line 402 or 412. In the event of the occurrence of the amplitude of 120 V at the conductor 51, there may be a voltage drop of 80 V across the voltage reducer 401 and a voltage drop of 40 V across the compensation current actuator 403.

The current-measuring elements 405, 415 are designed to measure the current between the conductors 51 and 52, respectively, on the one hand, and the line 55, on the other hand, for example via the voltage drop across a measuring resistor or via the voltage induced in a coil by the current.

The compensation current actuators 403 and 413 are preferably in the form of linear amplifiers, for example in the form of FET circuits or in the form of circuits with bipolar transistors. The desired compensation current can be set via the compensation current actuators 403 and 413.

The provision of the power supply unit 450 has the advantage that, independently of the present voltage at the conductors 51, 52, a drive voltage for driving the compensation current actuators 403 and 413 is ready. As a result, the compensation current actuators 403 and 413 can also be controlled when the phases HOT1 and HOT2, respectively, have a zero crossing at that time.

The compensation device 20 is additionally intrinsically safe and, if there are no phases HOT1 or HOT2 at the conductors 51 or 52, owing to the compensation current generation devices 28A, 28B it is also not possible for any faulty current to be generated. Preferably, the compensation current generation devices 28A, 28B operate in bipolar fashion, with the result that, for each phase, a suitable current can be impressed. In other words, with each compensation current generation device 28A, 28B, the compensation current can flow in both directions depending on the phase.

Figure 8:
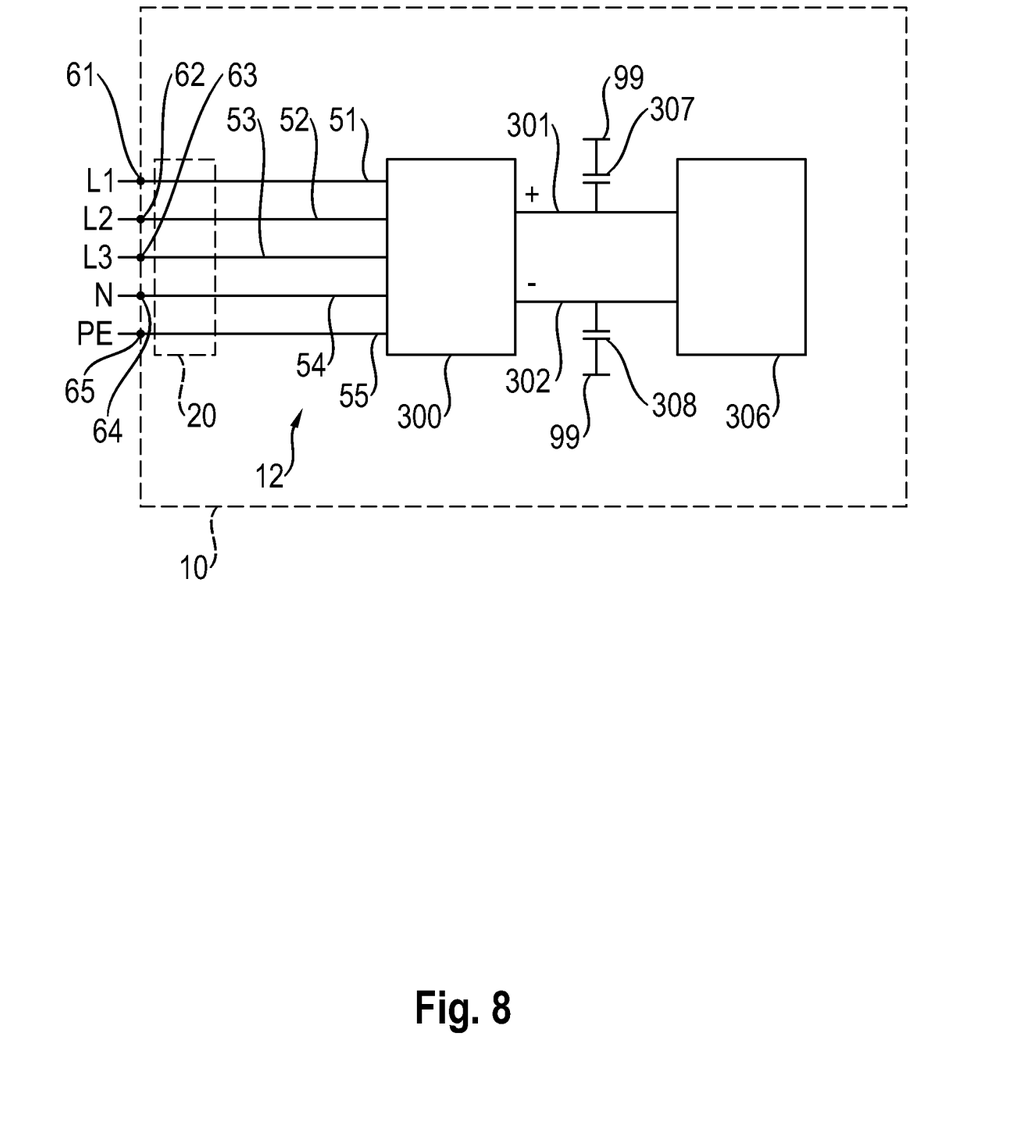
FIG. 8 shows a vehicle having a charging device and a compensation device.

FIG. 8 shows an exemplary embodiment for the use of the conductors 51 to 55 with the schematically indicated compensation device 20 in a vehicle 10, in particular in an electric vehicle or a hybrid vehicle. The conductors 51 to 53 (phase conductors or outer conductors), 54 (neutral conductor) and the conductor 55 (PE conductor), are connected to a rectifier (AC-DC converter) 300, and, at the output of the rectifier 300, the conductors 301 (+) and 302 (−) are provided, at which a DC voltage is present. The arrangement can therefore act as a charging device 12. The conductor 301 is connected to the PE conductor 99 via a capacitor 307, and the conductor 302 is connected to the PE conductor 99 via a capacitor 308. The conductors 301, 302 are connected directly or indirectly (for example via an additional DC-DC converter) to the load 306, for example a traction battery.

By virtue of the compensation device 20, the discharge currents can be compensated for to the extent that the fuse of the power supply grid during normal operation does not trip owing to the limit value for discharge currents being exceeded.

This is particularly advantageous in the case of charging devices 12 for electric vehicles or hybrid vehicles which have a galvanic coupling between the DC link 301, 302 and the conductors 51 to 54 or between a load and the conductors 51 to 54. As a deviation from the case of vehicles with galvanic isolation, as may be the case, for example, in the case of vehicles with transformers in the rectifier 300 or in a DC-DC converter, in the case of galvanic coupling the discharge currents are added together and are thus visible on the power supply grid. Therefore, the use of the compensation device 20 is particularly advantageous in the case of vehicles with galvanic coupling.

Naturally, within the scope of the invention, many developments and modifications are possible.

The capacitor arrangements 151, 152, 153, 154 are implemented in the exemplary embodiments in each case by a capacitor. However, they can also be implemented by a plurality of capacitors connected in parallel and/or in series.

What is claimed is:

1. A compensation device (20) for compensating for a discharge current, the compensation device (20) comprises a compensation current generation device (28), a potential generation device (150), active conductor terminals (61, 62, 63, 64) and a PE conductor terminal (65), wherein
    the active conductor terminals (61, 62, 63, 64) have a first active conductor terminal (61) and a second active conductor terminal (62; 64),
    the potential generation device (150) is interconnected with the first active conductor terminal (61) and has a potential generation device terminal (155), the potential generation device (150) is designed to provide a potential at the potential generation device terminal (155) that differs, at least temporarily, from the potential at the first active conductor terminal (61),
    the compensation current generation device (28) is designed to effect a compensation current (I_COMP) between the potential generation device terminal (155) and the PE conductor terminal (65), and
    the potential generation device (150) has a first capacitor arrangement (151; 170), and the potential generation device terminal (155) is interconnected with the first active conductor terminal (61) via the first capacitor arrangement (151).

2. The compensation device (20) of claim 1, wherein the potential generation device (150) is interconnected with the second active conductor terminal (62; 64), and wherein the potential generation device (150) is designed to provide a potential at the potential generation device terminal (155) that differs, at least temporarily, from the potential at the second active conductor terminal (62; 64).

3. The compensation device (20) of claim 1, wherein the potential generation device (150) has a second capacitor arrangement (152), and the potential generation device terminal (155) is interconnected with the second active conductor terminal (62; 64) via the second capacitor arrangement (152).

4. The compensation device (20) of claim 3, further comprising a line filter (160) that has X-capacitor arrangements for suppressing differential-mode interference and Y-capacitor arrangements for suppressing common-mode interference, the X-capacitor arrangements comprise a first X-capacitor arrangement between the first active conductor terminal (61) and the second active conductor terminal (62; 64), and the first capacitor arrangement (151) and the second capacitor arrangement (152) together form the first X-capacitor arrangement.

5. The compensation device (20) of claim 4, wherein the X-capacitor arrangements comprise a second X-capacitor arrangement between the first active conductor terminal (61) and a further active conductor terminal (63), the further active conductor terminal (63) is not the second active conductor terminal (62; 64), the first X-capacitor arrangement has a first capacitance, and the second X-capacitor arrangement has a second capacitance that is in a range of between 70% and 130% of the first capacitance.

6. The compensation device (20) of claim 4, wherein the Y-capacitor arrangements have a first Y-capacitor arrangement and a second Y-capacitor arrangement, the first Y-capacitor arrangement is connected between the first active conductor terminal (61) and the PE conductor terminal (25), and the second Y-capacitor arrangement is connected between the second active conductor terminal (62; 64) and the PE conductor terminal (65).

7. The compensation device (20) of claim 3, wherein the active conductor terminals (61, 62, 63, 64) have a third active conductor terminal (63), the potential generation device (150) has a third capacitor arrangement (153), and the potential generation device terminal (155) is interconnected with the third active conductor terminal (61) via the third capacitor arrangement (153).

8. The compensation device (20) of claim 7, wherein the potential generation device (150) has a fourth capacitor arrangement (170) connected between the compensation current generation device (28) and the potential generation device terminal (155).

9. A vehicle (10) comprising: a traction battery (306) and a charging device (12) for the traction battery (306), the charging device (12) having the compensation device (20) of claim 1 and a rectifier (300), the traction battery (306) being connected directly or indirectly to the rectifier (300) and being coupled galvanically to the active conductor terminals (61, 62, 63, 64) of the compensation device (20).

10. A compensation device (20) for compensating for a discharge current, the compensation device (20) comprising: a compensation current generation device (28); a DC link (303, 305) that has Y-capacitors (307, 308) having a first total capacitance; a potential generation device (150) having a second total capacitance that is in a range of from 60% to 140% of the first total capacitance; active conductor terminals (61, 62, 63, 64); and a PE conductor terminal (65), wherein
the active conductor terminals (61, 62, 63, 64) have a first active conductor terminal (61) and a second active conductor terminal (62; 64),
the potential generation device (150) is interconnected with the first active conductor terminal (61) and has a potential generation device terminal (155), the potential generation device (150) is designed to provide a potential at the potential generation device terminal (155) that differs, at least temporarily, from the potential at the first active conductor terminal (61), and
the compensation current generation device (28) is designed to effect a compensation current (I_COMP) between the potential generation device terminal (155) and the PE conductor terminal (65).

11. A compensation device (20) for compensating for a discharge current, comprising: compensation current generation devices (28A, 28B), active conductor terminals (61, 62, 63, 64), a PE conductor terminal (65), a power supply unit (450) and a control device (26), wherein
the active conductor terminals (61, 62, 63, 64) include a first active conductor terminal (61) and a second active conductor terminal (62), the compensation current generation devices (28A, 28B) comprise a first compensation current generation device (28A) and a second compensation current generation device (28B), the first compensation current generation device (28A) is connected between the first active conductor terminal (61) and the PE conductor terminal (65), the second compensation current generation device (28B) is connected between the second active conductor terminal (62) and the PE conductor terminal (65), the compensation current generation devices (28A, 28B) each have a compensation current actuator (403, 413), and the control device (26) is designed to drive, with the aid of the power supply unit, the compensation current actuators (403, 413) for generating a compensation current.

12. The compensation device (20) of claim 11, wherein the compensation current generation devices (28A, 28B) each have a voltage reducer (401, 411), the voltage reducers (401, 411) are provided between the compensation current actuator (403, 413) and the associated active conductor terminal (61, 62) and are designed to reduce the voltage at the associated compensation current actuator (403, 413) in comparison with the voltage at the associated active conductor terminal (51, 52).

13. The compensation device (20) of claim 12, wherein the voltage reducers (401, 411) each have a resistance or a voltage limiter.

14. The compensation device (20) of claim 11, wherein the compensation current generation devices (28A, 28B) each have a current-measuring element (405, 415) to measure the compensation current through the compensation current generation device (28A, 28B).

15. The compensation device (20) of claim 11, wherein each of the compensation current actuators (403, 413) is designed to enable a compensation current in both directions.

* * * * *